United States Patent [19]

Fujiwara et al.

[11] Patent Number: 5,253,054
[45] Date of Patent: Oct. 12, 1993

[54] FRAME SKIP ENCODING APPARATUS FOR MOVING IMAGES

[75] Inventors: Hiroshi Fujiwara; Hiroo Uwabu; Masanori Maruyama; Eiji Kakii, all of Tokyo, Japan

[73] Assignee: Graphics Communication Technologies Ltd., Tokyo, Japan

[21] Appl. No.: 752,095

[22] Filed: Aug. 29, 1991

[30] Foreign Application Priority Data

Jan. 31, 1991 [JP] Japan ................................. 3-032002

[51] Int. Cl.$^5$ ............................................ H04N 7/12
[52] U.S. Cl. .................................... 358/133; 358/105
[58] Field of Search ................. 358/105, 133, 85, 141, 358/313, 136

[56] References Cited

U.S. PATENT DOCUMENTS

| | | | |
|---|---|---|---|
| 4,060,832 | 11/1977 | Devimeux et al. | 358/133 |
| 4,985,767 | 1/1991 | Haghiri et al. | 358/133 |

FOREIGN PATENT DOCUMENTS

| | | |
|---|---|---|
| 0330455 | 8/1989 | European Pat. Off. |
| 0370315 | 5/1990 | European Pat. Off. |
| 8399487 | 11/1990 | European Pat. Off. |
| 63-102482 | 5/1988 | Japan |

OTHER PUBLICATIONS

"Teleconferencing"; Rao et al.; Van Nostrand Reinhold Co., Inc., 1985; pp. 48–54.

"Interframe Coding Using Adaptive Vector Quantizer"; Murakami et al.; Technical Report IE84-1 of the Institute of Electronic and Communication Engineers in Japan; Apr. 1984.

"Frame-Run Coding of TV signals, A New Method for Bandwidth Reduction", Research Cas Report #5064 of Postmaster-General's Department of Australia; Seyler; Sep. 1959.

"A 64 Bit/s Integrated Visual Communication System"; Yamaguchi et al. IEEE Journal SAC, vol. SAC-4 #8: Nov. '86.

Primary Examiner—Victor R. Kostak
Attorney, Agent, or Firm—Iandiorio & Dingman

[57] ABSTRACT

In a moving image encoding apparatus, an image signal is converted into a digital image signal by an A/D converter and is stored in frame memory 110. In addition, a movement vector detector 300 detects a movement of the output of the frame memory 110. In an orthogonal transformer 130, a difference signal between a present frame image which is stored in the frame memory 110 and a previous frame image which is stored in a variable delay frame memory 210 is supplied, in which the difference signal is converted by orthogonal transformation. The orthogonally transformed transformation signal is quantized into a linear or nonlinear discrete level on the basis of a step width of quantization from a step size controller 600 in a quantizer 140. Then, the quantized data is encoded into a variable length code in a variable length encoder 150. A movement vector detector 300 detects movement of the image by pattern matching processing between the present frame and the previous frame. A movement vector/encoding mode judger 310 generates the movement vector 3 and the encoding mode 4. The variable length code is transmitted to the transmission circuit after adding a movement vector 3 and encoding mode 4. In these operations, a frame rate controller 700 controls the processing rate of each frame image in the entire apparatus. Frame rate controller 700 calculates a total frame skip number $S_T$ which corresponds to the total number of frames that are not transmitted after a frame has been transmitted. The total frame skip number $S_T$ is calculated by selecting a smaller sum of an externally set signal $S_{min}$, signal $S_M$ which is calculated from the degree of movement compensation and $S_S$ which is calculated from the degree of quantization, and an externally set signal $S_{max}$.

3 Claims, 4 Drawing Sheets

FRAME SKIP ENCODING APPARATUS FOR MOVING IMAGES

BACKGROUND OF THE INVENTION

1. Field of the Invention

The present invention relates to an encoding device for moving images which encodes moving image signals by means of digital processing, and particularly to a variable frame rate type moving image encoding apparatus which appropriately controls the frame rate in accordance with the amount of image data to be produced and encoded.

2. Prior Art

In cases in which signals of moving images are transmitted, it is necessary to reduce the amount of data which is transmitted as much as possible by means of encoding. This is termed band compression, and in this type of moving image encoding apparatus, the encoded amount which is produced varies depending on the violence of the motion of the subject images, so that a method is known in which in accordance with the encoded amount produced, appropriate control of the frame rate (frame dropping) and control of the quantization step size of the image signals are conducted, and the time resolution and space resolution are controlled. For example, in Japanese Patent Application, First Publication, Laid Open No. SHO 63-102482, a method was disclosed in which control of the frame rate was conducted by means of an accumulated amount in a transmission buffer memory.

In the above described prior art, the frame rate alone was controlled in accordance with the accumulated amount of the transmission buffer memory, independently of the control of the quantization step size, and ideal control of the time and space resolution could not be conducted, so that there was a problem in that improvement in picture quality was limited.

SUMMARY OF THE INVENTION

It is accordingly an object of the present invention to provide a moving image encoding apparatus which minimizes the deterioration of picture quality by means of appropriately linking and conducting frame rate control and quantization step size control, and furthermore, to provide a moving image encoding apparatus which allows the external preferential selection of either frame rate control or quantization step control.

In order to achieve the above object, the present invention is provided with: a movement detection means for detecting movement of inputted moving images; a step size control means for determining a step width of the quantization by referring to a total frame skip number which was set at the time of an immediately preceding frame transmission; a first skip number calculation means for setting a value of a first skip number so that the greater the movement detected by the movement detection means at the time when one frame is transmitted, the smaller a value of the first skip number; a second skip number calculation means for setting a value of a second skip number so that the smaller the step size set by means of the step size control means at the time when a frame is transmitted, the smaller a value of the second skip number; a third skip number calculation means for outputting the smaller of a sum of an independently determined minimum skip number, the first skip number and the second skip number, and an independently determined maximum skip number as a total frame skip number; and a skip judgment means for controlling transmission so that a number of frames corresponding to the total frame skip number after a frame has been transmitted is not transmitted.

The first skip number reflects the movement of the image (time variation), and the second skip number reflects the space variation of the image, so that it is possible to conduct composite transmission frame number determination by means of determining a total frame skip number from the sum thereof, and furthermore by means of making the setting of the second skip number externally variable, it becomes possible to set the frame rate in a manner which is more appropriate to the transmitted images, and thus to improve image quality.

By means of the present invention, frame dropping (stepping) is conducted in accordance with the respective degrees of movement in the screen, that is, time variation, and space variation in the screen, so that encoding becomes possible which limits the deterioration of image quality in accordance with the quality of the screen, and furthermore, it is possible to exteriorly select whether time variation or space variation will be given priority in encoding, and thus the deterioration resulting from encoding is still further improved.

DETAILED DESCRIPTION OF THE PREFERRED EMBODIMENTS

Figure 4:
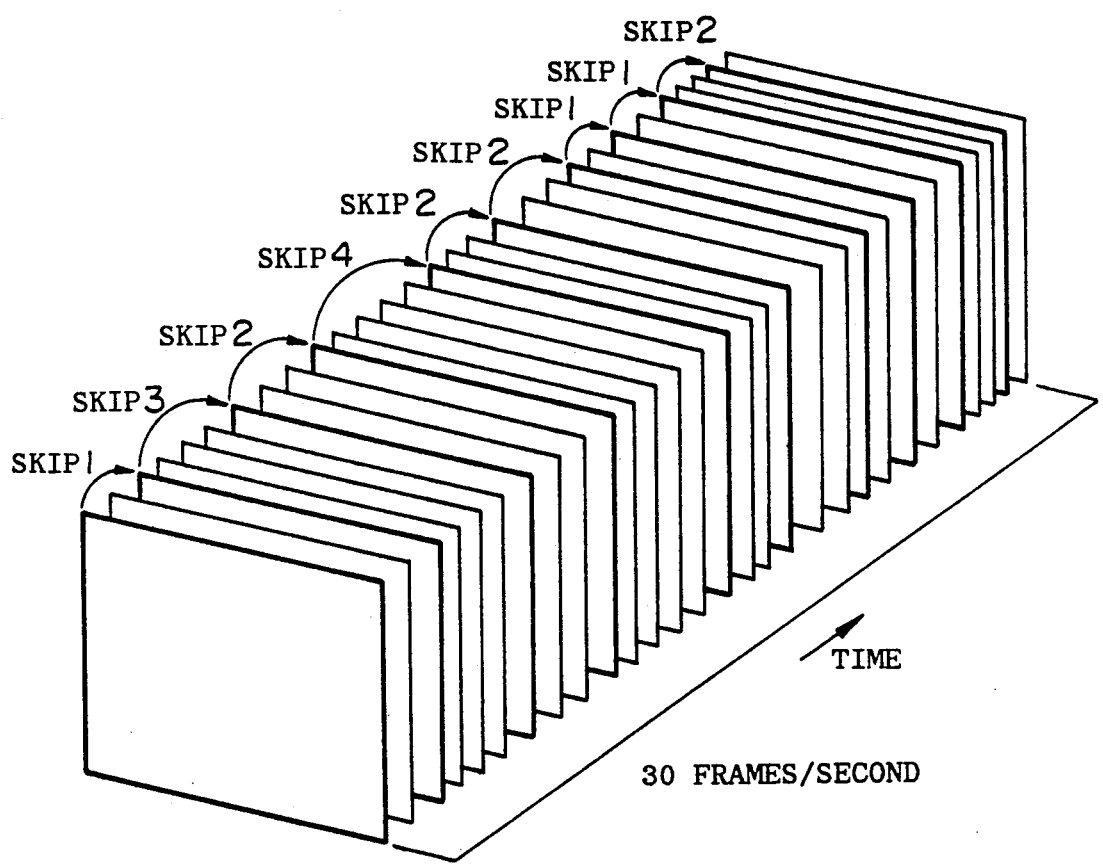
FIG. 4 is an explanatory diagram of the screen frame stepping.

Hereinbelow, the preferred embodiments of the present invention will be explained with reference to the diagrams. FIG. 4 shows 30 image signal frames of a commercial television arranged along a time axial direction; one frame corresponds to one screen, and in the space of one second, thirty screens are displayed. However, in moving image transmission systems in which the amount of data which can be transmitted is limited, 15 frames per second (step 1), 10 frames per second (step 2), 7.5 frames per second (step 3), 6 frames per second (step 4), or the like are transmitted.

Figure 1:
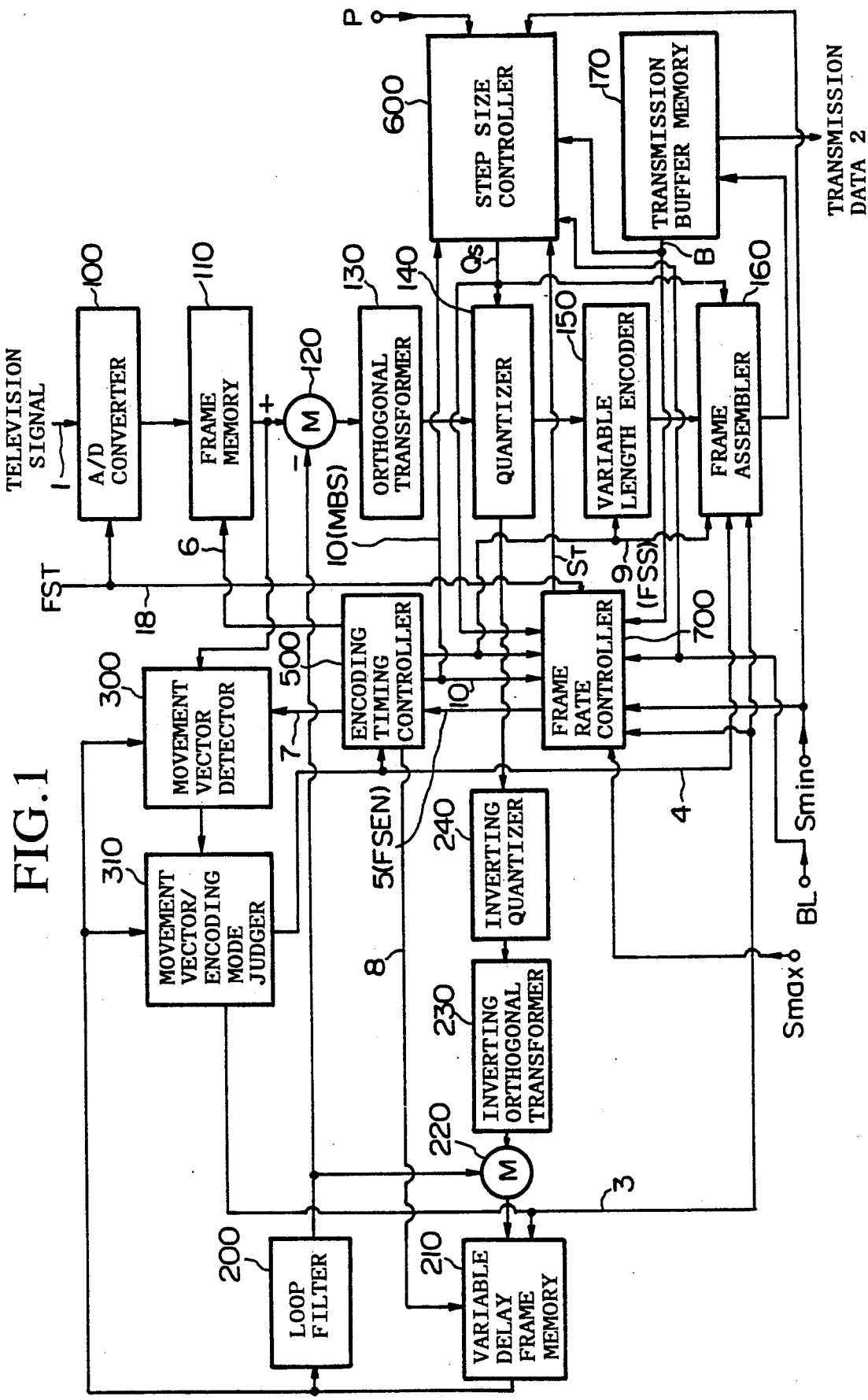
FIG. 1 is a block diagram showing a preferred embodiment of a moving image encoding apparatus in accordance with the present invention.

FIG. 1 shows a preferred embodiment of the present invention; it is used in transmission systems in which the amount of data which is transmitted is limited as in the above. The moving image encoding apparatus of the present preferred embodiment utilizes frame interval encoding using orthogonal transformation and movement compensation by means of movement vectors. Television signal 1 is converted to a digital image signal by A/D converter 100, and is stored in frame memory 110. As explained hereinafter, the regenerated image signal of the previous frame which is decoded locally is stored in variable delay frame memory 210, this image signal is passed through loop filter 200 and is inputted into subtracter 120, the difference between this signal and the present frame image are calculated, and this difference signal is inputted into orthogonal transformer 130. The general method of orthogonal transformation is presently discrete cosine transform, wherein the screen of one frame is divided into a number of blocks and cosine transform is carried out on the image data of each (for example, 8×8 pixels). The orthogonally transformed transformation signal is quantized into a linear or nonlinear discrete level in quantizer 140, and is encoded into a variable length code in accordance with the generation frequency by means of variable length encoder 150 and inputted into frame assembler 160. In frame assembler 160, the encoded image data and additional data (movement vector 3, encoding mode 4) are used to assemble a frame for transmission, this is accumulated in transmission buffer memory 170, and is transmitted to the transmission circuit as transmission data 2.

The present apparatus comprises a local decoding loop. In other words, the output of quantizer 140 is decoded to a regenerated image signal by inverting quantizer 240 and inverting orthogonal transformer 230, is added to the data of the previous frame by adder 220, and is stored in variable delay frame memory 210. The movement vector detector 300, which is necessary for movement compensation, detects movement by means of pattern matching processing between the present frame input and the previous frame input, and the results thereof are inputted into movement vector judger/encoding mode judger 310, and movement vector 3 and encoding mode 4 are generated as additional data. Encoding timing controller 500 has inputted thereinto encoding mode 4 and encoding frame starting signal (FSEN) 5, and generates and outputs frame memory control signal 6, movement vector detection control signal 7, variable delay memory control signal 8, encoding frame starting signal (FSS) 9 and encoding block synchronization signal (MBS) 10. Step size controller 600 determines the width of the discrete label (termed step size) in quantizer 140, has as inputs encoding block synchronization signal 10, total frame skip number $S_T$, buffer accumulation amount B, transmission rate setting value P, which is an externally set signal, minimum frame skip number setting value Smin, and buffer limiting value $B_L$, and outputs step size Qs. The operation of all the above parts is identical to that of the conventional apparatus; however, frame rate controller 700 controls the image processing frame rate of the entire apparatus by controlling encoding timing controller 500, which is a special feature of the present invention. Frame rate controller 700 has as inputs thereof minimum and maximum frame skip number setting values Smin and Smax, which are externally set signals, buffer limiting value $B_L$ and frame clock signal (FST) 18, and furthermore movement data 3, buffer accumulation amount B, encoding frame starting signal 9, encoding block synchronization signal 10, and step size Qs are inputted as internal signals. Based on these inputs, and by a predetermined method, frame rate controller 700 generates the encoding frame starting signal 5, and selects and controls the image frames which are to be processed by the entire apparatus.

Figure 2:
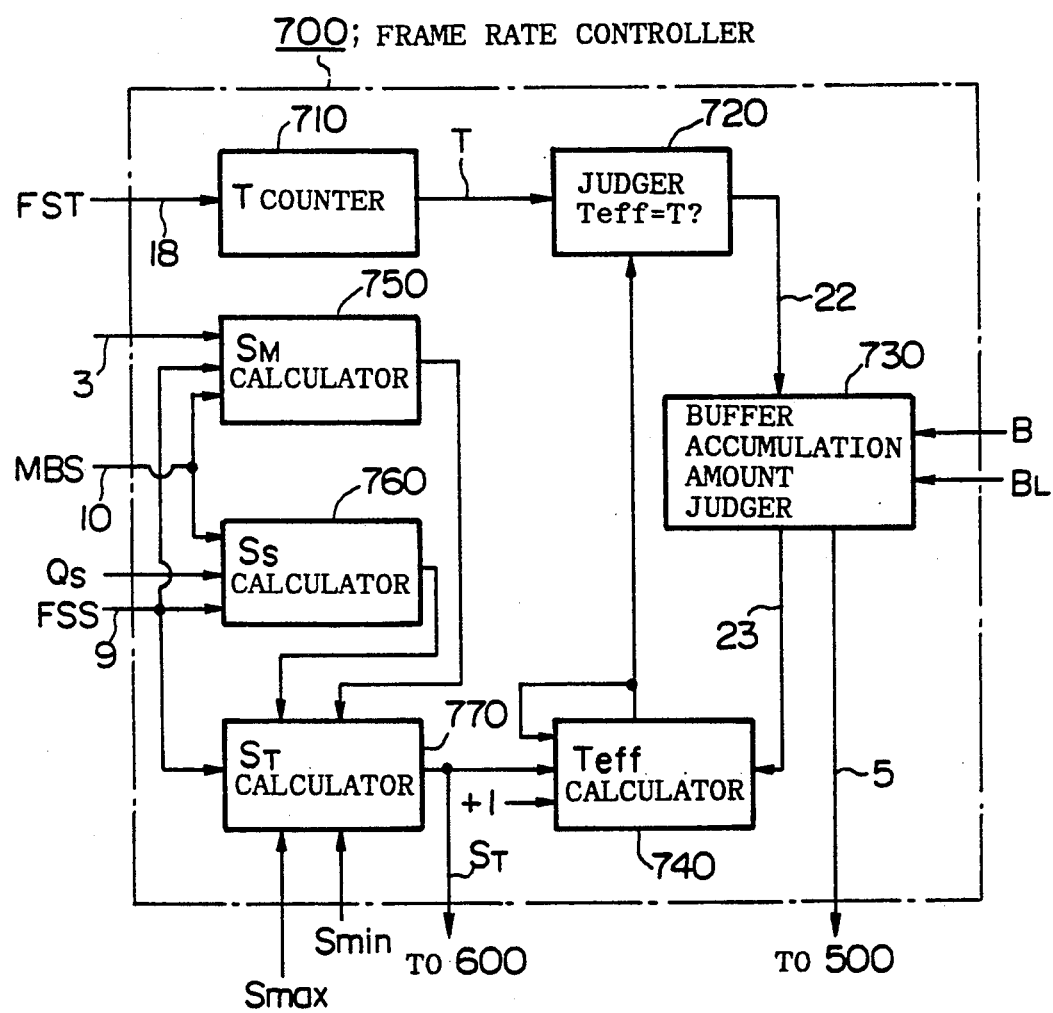
FIG. 2 is a diagram showing a structural example of the frame rate control part.

FIG. 2 shows a concrete structural example of frame rate controller 700 of FIG. 1; first, frame clock signal 18 is counted in T counter 710 and is given image frame number T. If the frame clock signal 18 is a signal having a frequency of 30 Hz, the frame number T will have cyclical values from 1 to 30. This value is compared in judger 720 with an encoding effective frame number Teff. When the results of the comparison of judger 720 show nonagreement, the frame corresponding to frame number T is skipped, and an agreement signal 22 is outputted to buffer accumulation amount judger 730 only when agreement is found by judger 720. In judger 730, buffer accumulation amount B and buffer limiting value $B_L$ are compared, and in the case in which B is less than $B_L$, that is, in the case in which the accumulation amount B of transmission buffer memory 170 is smaller than the limiting value $B_L$ supplied from outside, the enCoding starting signal 5 is set to ON and is transmitted to the encoding timing controller 500 of FIG. 1, and encoding processing is begun. On the other hand, in the case in which B is greater than or equal to $B_L$, signal 23 is outputted, and by means of this, Teff calculator 740 adds a value of 1 to Teff and supplies this to judger 720. By means of this, when a value of 1 is added to the frame number T of T counter 710, the comparison of judger 720 will show agreement. In this manner, when the accumulated amount B of transmission buffer memory 170 falls below the limiting value $B_L$, encoding and transmission are conducted. Furthermore, the determination of encoding effective frame number Teff, which is conducted by means of Teff calculator 740 when a total frame skip number $S_T$ is inputted, is conducted according to the following formula.

$$\text{Teff} = \text{Teff (the value in the previous state)} + S_T + 1 \quad (1)$$

Next, the determination method for total frame skip number $S_T$ will be explained. This determination is conducted synchronously with encoding block synchronization signal 10 when encoding frame starting signal 9 is inputted. First, in $S_M$ calculator 750, movement vector 3 is inputted, and movement compensation prerequisite frame skip number $S_M$ is calculated. Concretely, a search is conducted for the presence or absence of movement compensation by blocks, which are the division units for orthogonal transformation, a movement compensation block number is counted for each frame, and skip numbers $S_M$ are determined in accordance with these block numbers as shown in Table 1. As shown in the table, when the movement is violent, the skip number $S_M = 0$, and as movement decreases, $S_M$ becomes larger.

TABLE 1

| Movement Compensation Block Number | $S_M$ |
|---|---|
| 0–6 | 3 |
| 7–12 | 2 |
| 13–25 | 1 |
| more than 26 | 0 |

Next, in $S_s$ calculator 760, quantization step size Qs is inputted, and quantization step size prerequisite frame skip number $S_s$ is calculated. For this purpose, the average quantization step size of the previous screen frame is calculated from input Qs, and as shown in Table 2, the larger this value, the larger the skip number $S_s$ becomes.

TABLE 2

| Quantization Step Size of Preceding Screen Frame | $S_S$ |
|---|---|
| 2–10 | 0 |
| 12–18 | 1 |
| 20–26 | 2 |
| 28–34 | 3 |
| 36–50 | 4 |
| 52–58 | 5 |
| 60–62 | 6 |

TABLE 3

| Average Quantization Step Size of Previous Screen Frame | $S_s$ | | |
|---|---|---|---|
| | Time Priority | Intermediate | Space Priority |
| 2–6 | 0 | 0 | 0 |
| 8–10 | 0 | 0 | 1 |
| 12–14 | 0 | 1 | 1 |
| 16–18 | 1 | 1 | 2 |
| 20–22 | 1 | 2 | 2 |
| 24–26 | 2 | 2 | 3 |
| 28–30 | 2 | 3 | 3 |
| 32–34 | 3 | 3 | 4 |
| 36–38 | 3 | 4 | 4 |
| 40–42 | 4 | 4 | 4 |
| 44–46 | 4 | 4 | 4 |
| 48–50 | 4 | 4 | 5 |
| 52–54 | 4 | 5 | 5 |
| 56–58 | 5 | 5 | 6 |
| 60–62 | 5 | 6 | 6 |

Table 3 shows a different example of skip number $S_s$; the average quantization step size is divided into 15 steps and skip numbers $S_s$ are determined for each. A case in which time resolution has previously been given priority (the time priority column of Table 3), a case in which space resolution has been given priority (the space priority column of Table 3; the skip numbers $S_s$ have larger values than in the case of time priority), or an intermediate case (the intermediate column of Table 3) can be selected, and it is possible to enable a user to externally indicate this selection.

In the same way as in the above, skip number $S_M$ is calculated from the degree of movement compensation, and skip number $S_s$ is calculated from the degree of quantization. A total frame skip number $S_T$ is calculated in the following manner by $S_T$ calculator 770 from these values and minimum frame skip number setting value Smin and maximum frame skip number setting value Smax, which are externally set signals. First, the calculation $$S_T = S_S + S_M + S_{min} \quad (2)$$

is conducted, and if $S_T >$ Smax, $S_T =$ Smax is outputted, while if $S_T \leq$ Smax, the value of $S_T$ which was determined is outputted in an unchanged manner. As stated above, this value is used in the calculation of effective frame number Teff according to formula (1) In this manner, in the present preferred embodiment, the following frame skip number $S_T$ is determined in accordance with both the degree of movement and the degree of quantization.

Figure 3:
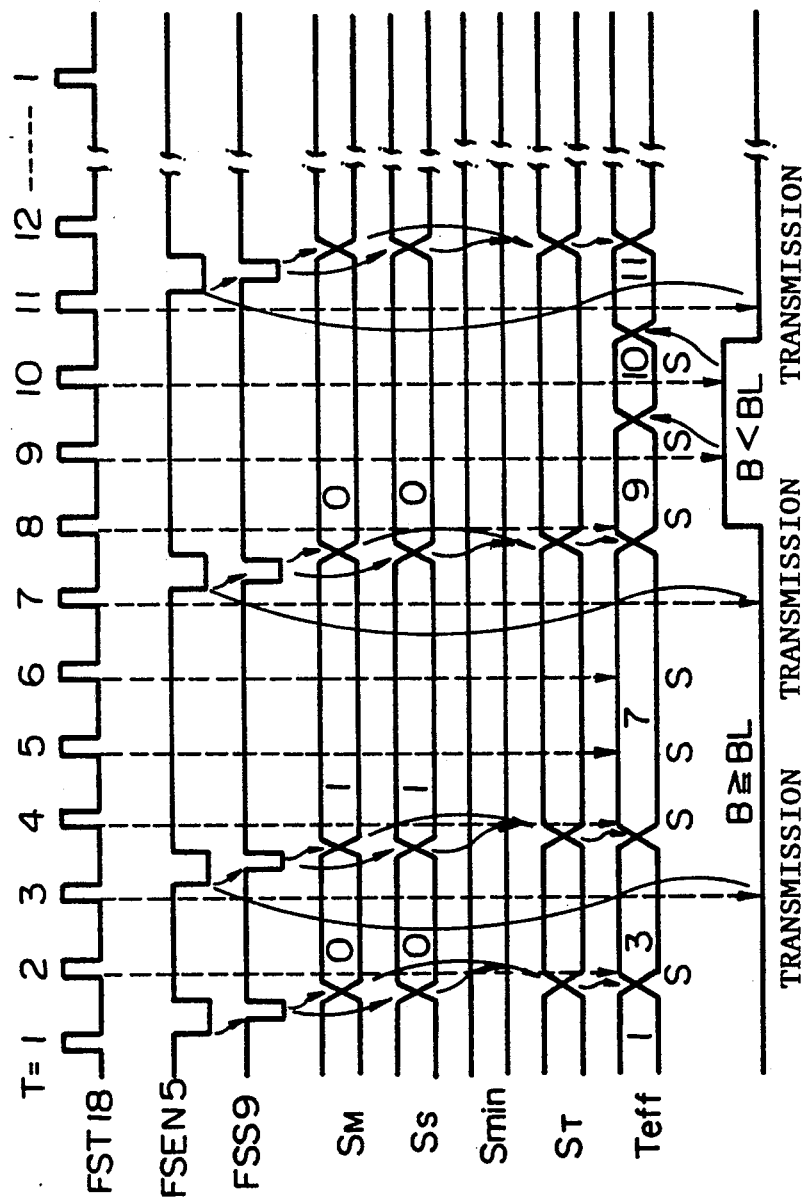
FIG. 3 is a time chart showing an operational example of the preferred embodiment of FIG. 1.

FIG. 3 is a time chart which shows the overall operation of the present preferred embodiment. In the initial state, when the initial frame T=1, then $S_T=0$, and effective frame number Teff is determined by means of formula (1). Furthermore, the value of minimum frame skip number setting value Smin is set to 1, and until T=8, the accumulation amount B of transmission buffer memory 170 does not exceed buffer limiting value $B_L$ (B<$B_L$). By proceeding in this manner, when T=1, then Teff=1, and both are in agreement, so that starting signal 5 (in FIG. 3, a negative pulse) is outputted, and at the starting edge thereof, encoding block starting signal 9 (negative pulse) is outputted from timing controller 500, a frame having a frame number T=1 is encoded, and is written into transmission buffer memory 170. At the same time, by means of signal 9, the movement compensation prerequisite frame skip number $S_M$ and quantization step size prerequisite frame skip number $S_s$ are calculated in frame rate controller 700 in accordance with Tables 1 to 3; however, as in the initial state, the average value of quantization step size Qs is sufficiently small, and $S_M = S_s = 0$. Accordingly, calculations are carried out in the $S_T$ calculator in accordance with formula (2), so that $S_T =$ Smin = 1, and calculations are carried out in Teff calculator 740 in accordance with formula (1), so that Teff = 1+1+1=3.

When the value of T=2, T≠Teff, so that starting signal 5 is not outputted, and this frame is skipped and is not transmitted (in FIG. 3, this is indicated by means of S). Furthermore, the values of skip numbers $S_M$ and $S_s$ are not updated, and accordingly, as is clear from formulas (1) and (2), the updating Of skip number $S_T$ and effective frame number Teff is not conducted. When the value of T=3, then T=Teff, starting signal 5 is outputted, and the screen of frame number 3 is transmitted. If the output of $S_M$ calculator 750 and $S_s$ calculator 760 is assumed to be skip number $S_M = S_s = 1$, then in accordance with the movement vector 3 detected at this time and in accordance with the value Of quantization step size Qs, $S_T$ calculator 770 outputs a value of $S_T = 3$, and accordingly, the value of effective frame number Teff outputted by Teff calculator 740 is 7. Accordingly, after this, the frames corresponding to T=4–6 are skipped, and the frame having the value of T=7 is next inputted into transmission buffer memory 170; however, the transmission operation is not followed, as here the accumulation amount B of buffer memory 170 exceeds limiting value $B_L$. When this occurs, the updating of the values of skip numbers $S_M$ and $S_s$, and accordingly, skip number $S_T$, is carried Out; however, after this, until the buffer memory 170 is emptied and B<$B_L$, transmission and updating of Skip number values are not conducted, and from the point where the value of T=8 onward, only the effective frame number Teff is increased in increments of 1 by means of signal 23 from buffer accumulation amount judger 730. Then, after B has become less than $B_L$ (in FIG. 3, from the point where the value of T=11 onward), transmission begins again.

What is claimed is:

1. A moving image encoding apparatus which, after converting each frame of an inputted moving image signal into a digital signal, conducts orthogonal transformation and quantization on each block into which a screen is divided, and transmits digital data which have been quantized as variable length code through the medium of a transmission buffer, a moving image encoding apparatus which is provided with:

a movement detection means for detecting movement of inputted moving images;

a step size control means for determining a step width of said quantization by referring to a total frame skip number which was set at the time of an immediately preceding frame transmission;

a first skip number calculation means for setting a value of a first skip number so that the greater the movement detected by said movement detection means at the time when one frame is transmitted, the smaller a value of said first skip number;

a second skip number calculation means for setting a value of a second skip number so that the smaller said step size set by means of said step size control means at the time when a frame is transmitted, the smaller a value of said second skip number;

a third skip number calculation means for outputting a smaller of a sum of an independently determined minimum skip number, said first skip number and said second skip number, and an independently determined maximum skip number as a total frame skip number; and a skip judgment means for controlling transmission so that a number of frames corresponding to said total frame skip number after a frame has been transmitted is not transmitted.

2. A moving image encoding apparatus in accordance with claim 1, in which said skip judgment means incorporates an accumulation amount of said transmission buffer and a buffer limiting value determined in advance as an upper limit of said accumulation amount, and when a determination has been made that one frame is to be transmitted, if said accumulation amount exceeded said buffer limiting value, a frame which is inputted immediately after an exceeded state ended is transmitted in place of said transmission frame.

3. A moving image encoding apparatus in accordance with claims 1 or 2, in which said second skip number, which is outputted by said second skip number calculation means in response to each step size, is made variable.

* * * * *